United States Patent
Zhang et al.

(10) Patent No.: US 9,827,690 B2
(45) Date of Patent: Nov. 28, 2017

(54) SLEEVE FOR A SAWING BEAD OBTAINED BY METAL INJECTION MOULDING

(71) Applicant: NV BEKAERT SA, Zwevegem (BE)

(72) Inventors: Shanning Zhang, Liaoning (CN); Tom Baekelandt, Zwijnaarde (BE); Jan Deconinck, Etterbeek (BE)

(73) Assignee: NV BEKAERT SA, Zwevegem (BE)

( * ) Notice: Subject to any disclaimer, the term of this patent is extended or adjusted under 35 U.S.C. 154(b) by 76 days.

(21) Appl. No.: 14/647,637

(22) PCT Filed: Nov. 15, 2013

(86) PCT No.: PCT/EP2013/073905
§ 371 (c)(1),
(2) Date: May 27, 2015

(87) PCT Pub. No.: WO2014/082870
PCT Pub. Date: Jun. 5, 2014

(65) Prior Publication Data
US 2015/0298353 A1    Oct. 22, 2015

(30) Foreign Application Priority Data
Nov. 30, 2012    (EP) ..................... 12195008

(51) Int. Cl.
B28D 1/12    (2006.01)
B22F 5/10    (2006.01)
(Continued)

(52) U.S. Cl.
CPC .............. B28D 1/124 (2013.01); B22F 3/004 (2013.01); B22F 3/12 (2013.01); B22F 5/106 (2013.01); B23D 61/185 (2013.01); B23D 65/00 (2013.01)

(58) Field of Classification Search
CPC . B22F 3/004; B22F 3/12; B22F 5/106; B23D 61/185; B23D 65/00; B28D 1/124
See application file for complete search history.

(56) References Cited

U.S. PATENT DOCUMENTS 1,909,344 A * 5/1933 Green ..................... F16G 11/02
191/44.1
5,802,437 A * 9/1998 Wohlfromm .............. B22C 1/00
419/37
(Continued)

FOREIGN PATENT DOCUMENTS

BE    WO 2011061166 A1 *    5/2011    ........... B23D 61/185
BE    WO 2012119946 A1 *    9/2012    ............. B23D 65/00
(Continued)

OTHER PUBLICATIONS

International Search Report (ISR) dated Jan. 17, 2014, for PCT/EP2013/073905.

*Primary Examiner* — Marc Carlson
(74) *Attorney, Agent, or Firm* — Bacon & Thomas, PLLC

(57) ABSTRACT

Metal sleeves are used as carriers for the abrasive layer of sawing beads. Such sawing beads are threaded on a steel cord and are separated by a polymer thus forming a sawing cord for sawing of hard and brittle materials such as stone or concrete. These metal sleeves have a large influence on the overall performance as well as on the cost of the sawing cord. The inventors propose the method of metal injection molding to make the metal sleeves in large quantities with an optimized geometry which is not possible with the current methods for making the metal sleeves. Over and above the inventive sleeves are particularly well suited for application of the abrasive layer by means of laser cladding. Beads made by laser cladding on the inventive metal sleeves as well as sawing cords comprising such beads are therefore part of the invention.

14 Claims, 5 Drawing Sheets

(51) Int. Cl.
*B22F 3/12* (2006.01)
*B22F 3/00* (2006.01)
*B23D 61/18* (2006.01)
*B23D 65/00* (2006.01)

(56) References Cited

U.S. PATENT DOCUMENTS

| | | | | |
|---|---|---|---|---|
| 6,051,184 A | * | 4/2000 | Kankawa | B22F 1/0059 |
| | | | | 419/36 |
| 2006/0099103 A1 | * | 5/2006 | Wohlfromm | B22F 1/0059 |
| | | | | 419/23 |
| 2007/0194492 A1 | * | 8/2007 | Floratti | B23D 61/185 |
| | | | | 264/259 |
| 2015/0298353 A1 | * | 10/2015 | Zhang | B23D 61/185 |
| | | | | 125/21 |

FOREIGN PATENT DOCUMENTS

| | | | |
|---|---|---|---|
| DE | 19522655 A1 | | 1/1997 |
| EP | 0728552 A1 | | 8/1996 |
| GB | 2243094 A | | 10/1991 |
| JP | H09-314544 A | | 12/1997 |
| JP | 10006329 A | * | 1/1998 |
| JP | 2000-176737 A | | 6/2000 |
| WO | 2011-061166 A1 | | 5/2011 |
| WO | 2012/119946 A1 | | 9/2012 |
| WO | 2012/119947 A1 | | 9/2012 |
| WO | 2013/102542 A1 | | 7/2013 |

* cited by examiner

SLEEVE FOR A SAWING BEAD OBTAINED BY METAL INJECTION MOULDING

The invention relates to a metal sleeve that is specifically adapted for use as the carrier sleeve of an abrasive layer in a sawing bead, the sawing bead built around such sleeve and a sawing cord using such beads. The sleeve is made by means of a metal injection moulding process that brings particular advantages for the sawing beads in its use and in its making.

BACKGROUND ART

Sawing cords—sometimes also referred to as sawing wires—are extensively used for sawing stones in quarries and on stationary slabbing machines. Sawing cords are for the purpose of this application understood to be an assembly of sawing beads threaded on a steel cord and spaced apart by a polymer that is injection moulded around the cord.

The sawing bead itself is generally made up of a sleeve to which an abrasive layer is attached. The abrasive layer is made of a compound of metal and abrasive particles that is obtained by powder metallurgy. A mixture of metal powder and abrasive particles are pressed together in an annular shape to form a compact. The compact itself is sintered under a reducing gas atmosphere. The thus densified compact is then brazed onto a small metal sleeve.

Recently an alternative production method has been developed wherein the abrasive layer is directly applied onto the metal sleeve by means of laser cladding. See WO 2012/119946 and WO 2012/119947. Such method can be used in combination with other ways of making a sawing cord as e.g. described in WO 2011/061166.

Although the metal sleeve is only a humble part in the total of a sawing cord, the inventors have found that it does have a large influence on the overall performance of the sawing cord.

As the sleeve is close to the steel cord or even in contact therewith there is the risk for wear of the steel cord. Indeed as the sleeve is relatively rigid compared to the flexible cord the cord may contact the rim of the sleeve upon bending leading to premature failure of the cord. Therefore different chamfered exit openings have been envisioned (see JP10006329, JP9314544, GB 2243094).

Also the bond between the sleeve and the abrasive layer and the bond between the sleeve and the steel cord must be good as all forces acting on the abrasive layer are transferred to the steel cord through mediation of these bonds. To this end it has been suggested to make the sleeves with multiple holes (JP 2000176737) for better anchorage of polymer and abrasive layer.

It has also been suggested to make a recess at the end of the sleeve for better anchorage of the polymer and/or better removal of debris (DE195 22655, EP0728552). DE 195 22655 suggests to make the sleeve in plastic.

As many as 40 beads can be present per meter of sawing cord. So every cent saved results in a decreased cost of 40 cent per meter of wire. At present sleeves are made by machining and cutting from tubes. This is expensive, certainly when one wants to have a controlled and more complicated shape. The inventors therefore explored other ways to produce the metallic sleeve.

SUMMARY OF THE INVENTION

The primary object of the invention is to provide a sleeve that is cheaper to manufacture in big quantities. A further object is to provide a sleeve that is specifically adapted for attaching an abrasive layer on it by laser cladding. Another objective is to offer a method that enables to make the metal sleeves with a large degree of freedom in terms of shape and material composition. The final object of the invention is to provide a sawing bead and a sawing cord comprising sawing beads that have particular advantages to currently known sawing cords by virtue of their metal sleeves.

According a first aspect of the invention a metal sleeve for use as a carrier of an abrasive layer of a sawing bead according the combination of features of claim 1 is defined. Specific features for preferred embodiments of the invention are set in the dependent product claims.

The metal sleeve for use as a carrier of an abrasive layer of a sawing bead has an axial bore with an axial middle part and chamfered openings at either end. Specific about the sleeve is that it is made by 'metal injection moulding'.

The technique of metal injection moulding allows to make large series (for example more than hundred thousand) of small metallic objects (e.g. less than twenty grams) at low cost. The technique comprises the steps of:

Thoroughly mixing a binder with a metal powder to obtain a homogeneous feedstock mixture or obtaining a readymade feedstock;

Injection moulding the mixture into a mould thereby forming a 'green' sleeve;

Removing the green sleeve from the mould;

Debinding the binder from the green sleeve thereby forming a 'brown' sleeve;

Sintering the brown sleeve up to maximal densification.

The colours 'green' and 'brown' are customarily used in the field of metal injection moulding but do not bear any relation to the true colour of the part. They are only indicative of the state of the sleeve: 'green' can be substituted by 'fresh' and 'brown' by 'baked'.

Binders are mixtures of organic molecules such as paraffin wax, polyolefins (such as polyethylenes, polypropylenes, polystyrenes, polyvinylchlorides, polyethyleneglycol, polyoxymehtylene and many others) and stearic acids.

The composition of the binders determines the debinding mode for the green sleeve. Currently there are three main system:

Thermal debinding wherein the binder comprises constituents that evaporate stepwise with increasing temperature (e.g. Advamet® feedstock). The more temperature resistant constituents only evaporate when the remaining porous powder structure approaches the sintering temperature. Thermal debinding has the advantage that debinding and sintering can be performed in one single furnace (e.g. in a Nabertherm furnace) with a programmable heating and gassing cycle.

Solvent based debinding wherein some constituents of the binder easily dissolve in a liquid solvent while the remaining insoluble constituents guarantee the binding till sintering. While in the past volatile organic solvents were used, for environmental reasons a shift towards water solvable constituents (polar molecules such as e.g. polyethyleneglycol) has taken place. The latter are obviously preferred. Commercial available examples are PolyMIM® feedstock that is debound in a LöMI water debinding furnace.

Catalytic-phase erosion. In this debinding system one of the constituents is reacted away by interaction with a reactant. For example the constituent can be polyoxymethylene while the reactant is nitric acid vapour in nitrogen. The resulting formaldehyde must be burned off. A well-known catalytic feedstock is Catamold® of BASF that can be debound in a CM furnace with burn-off facility.

Sintering is carried out either in the same furnace as debinding (in case of thermal debinding) or in dedicated furnaces. Temperatures used depend on the kind of metal powder used but for steels this is usually above 1200° C. Protective gases such as nitrogen, hydrogen or argon are used in order to prevent oxidation of the metal powders. The purpose of sintering is to melt the powder and consolidate the part. The fact that the sleeve has been made by metal injection moulding remains traceable on the final product in that minute spherical cavities remain visible in a metallographic cross section.

The use of metal injection moulding allows to produce metal sleeves at low cost with a large degree of freedom in form. One only has to take into account the quite large shrinkage that occurs during sintering of the brown sleeve to the final product. The linear shrinkage factor 'f' (i.e. the shrinkage in one dimension only, and not in volume) can be estimated from the metal powder volume fraction 'γ' in the feedstock and the mass density ratio of the metal obtained after sintering to its theoretical maximum 'α': $f=(\alpha/\gamma)^{1/3}$. This is under the assumption that shrinkage is isotropic. In general 'α' must be higher than 95% in order to have sufficient densification.

The metal powder used will to a great extent determine the mechanical and geometrical properties of the resulting sleeve. Particularly preferred metal powder compositions are steel based for their strength and temperature resistance. A preferred composition is a steel comprising up to 0.8 wt % of carbon, less than 0.5 wt % of silicon, and one or more metals out of the group comprising nickel, manganese, molybdenum, chromium, copper the balance being iron.

Preferred examples are
Iron nickel steel (less than 0.2 wt % C; 1.9 to 8.0 wt % Ni; the balance being iron),
stainless steels such as austenitic 316L (C≤0.03 wt %; 16 to 18% wt Cr; 10-14 wt % Ni; Mn≤2%; 2-3 wt % Mo; Si≤1 wt %; the balance being iron),
Precipitation hardenable steels 17-4PH (C≤0.07 wt %; 15-17.5 wt % Cr; 3-5 wt % Ni; 3-5 wt % Cu; 0.15-0.45 wt % Nb; Mn≤1 wt %, Si≤1 wt %; the balance being iron).
304L (C≤0.08 wt %; 18-20 wt % Cr; 8-10.5 wt % Ni; the remainder being iron).

As the metal sleeve must be sufficiently strong not to be torn apart during sawing an ultimate tensile strength (UTS) of 250 MPa is considered a minimum by the inventors. More preferred is if the ultimate tensile strength is larger than 500 MPa or even more than 1000 MPa. On the other hand some ductility is expected from the metal sleeve as it may be impacted severely during use and it is best that the impact energy is taken up plastically. Therefore the ratio between yield strength $R_{p0.2}$ and UTS of about between 50 and 85% is preferred.

In particular the metal of the metal sleeve must be able to survive temperatures in excess of 1000° C. that occur during laser cladding of the bead. On the other hand the melting point should not be too high to enable the formation of a binding layer when the abrasive layer is applied through laser cladding. Therefore it is best if the sintering temperature for the metal powder feedstock is about the same as that of the temperature occurring during laser cladding. The window for the sintering temperature between from 1200° C. to 1400° C. is therefore considered a good balance between both requirements.

Feedstock mixtures are preferably obtained in the form of pre-mixed pellets. The type of debinding system is not essential to the invention. However, the magnitude of the metal powder in the feedstock has some importance to obtain a metal sleeve suitable for use as carrier of an abrasive layer. During sintering the metal powder particles coalesce into larger grains resulting in a tiled pattern at the surface of the metal sleeve whose dimensional features are largely determined by the size of the coalesced grains. These coalesced grains result in a certain roughness of the outer surface of the sleeve with advantageous properties for use of the metal sleeve as a carrier for the abrasive layer of the sawing bead. Therefore the inventors prefer the median particle size of the metal powders to be at least 2 μm, preferably 5 μm or 10 μm or more. When the powders are too small the surface becomes too smooth. Particle sizes in excess of 50 μm result in problems to keep the overall geometrical tolerance of the metal sleeve.

The outer surface roughness of the sleeve is also influenced by the internal surface of the mould in which the sleeve is produced. This internal surface can be textured (e.g. by sandblasting) so as to impose an isotropic roughness pattern on the surface of the sleeve. This leads to a highly reproducible surface roughness which is desirable for laser cladding.

In conventional metal sleeves any kind of additional feature such as the internal or external shaping of the sleeve, an internal threading or surface treatment all give rise to extra handling which means extra cost. For the metal sleeves according the invention these additional features add a negligible cost for the large series envisioned.

Typically the size of the metal sleeve is about 11 mm long with an outer diameter of 7 mm and an inner diameter of 5 mm (which weighs about 1.6 grams). The abrasive layer on top of it gives it an outer diameter of 9 to 11 mm. This is the size of sleeve typically used for block extraction in quarries. Bead sleeves for slabbing are about 11 mm long with an inner diameter of 3.7 mm, an outer diameter of 5.0 mm (7.0 to 7.5 mm with abrasive layer). They weigh only 0.77 grams. In the future, sleeves with even smaller internal diameters such as 3.0 mm or even lower than 2.5 mm, an outer diameter of at the most 4 mm with a wall thickness of less than 0.5 mm, a length of 11 mm or lower with a weight of less than 0.5 gram and an overall diameter of less than 7.0 mm are considered.

The inventors have found that the shape of the metal sleeve has a large influence on—amongst others—the fatigue life of the sawing cord and the adhesion of the beads. Preferable embodiments of a sleeve with an axial length 'L' have an axial bore with an axial middle part and chamfered or stepwise openings at either end. The axial middle part is cylindrical with a length of between 0.25×L to 0.75×L. Although it is preferred, it is not a necessity of the invention that the axial middle part is exactly in the middle. It suffices that the axial middle part comprises the midpoint of the sleeve.

The chamfered openings are such that the inner diameter '$d_{min}$' is minimal midways of said sleeve and open up to an inner diameter '$d_{max}$' at the ends of the sleeve. Preferably the radii of curvature are at least $(d_{max}-d_{min})/2$ in a cross section comprising the axis of the sleeve. For example the chamfered openings at either end can be conical in shape. Even more preferred is that the inner surface of the chamfered openings at either end are described by an axial revolution of a curve of second degree. For example an ellipse or a parabola.

By preference the chamfered opening show a radius of curvature that follows the curve of the steel cord when bent. The radius of curvature of the cord is determined by the stiffness of the steel cord, the tension applied and the exit angle of the sawing cord. With 'exit angle' is meant the deviating angle the sawing cord makes when coming out of the stone (or entering it). For the currently used steel cords (having a diameter of about 3.0 to 5.0 mm) the radius of curvature of the chamfered opening should be between 10 and 30 mm, preferably between 10 and 20 mm.

By preference the axial bore has an internal helical threading of which the grooves are deepest at the middle part of the axial bore and less deep at the chamfered openings. The threading serves to improve the anchorage of the sleeve to the polymer on the steel cord. Such anchorage is of importance in order to transfer the forces acting on the abrasive layer to the steel cord. A smooth inner surface does not give enough grip. The threading has a certain 'thread angle' that corresponds to the angle between the threading and the axis of the sleeve when projected onto an axial plane.

The smaller the thread angle becomes, the better the sleeve will resist to the torque exerted by the cord on the bead during sawing. However, a too low thread angle results in a loss of axial anchorage with a risk that the sleeve is pulled from the polymer on the cord. On the other hand, the thread angle should not near a right angle because then— although the axial anchorage will be optimal—the bead will start to rotate around the cord resulting in loose beads. Loose beads are to be avoided as they lead to asymmetric wear of the bead.

A particular preferred embodiment of the metal sleeve is when the angle between the internal threading of the sleeve and the strands of the cord is close to perpendicular. As the forces acting on the steel cord are transferred over the strands, the maximum holding force is when the ribs formed in the threading by the polymer are about perpendicular to the strands. It is therefore preferred that the lay direction of the strands in the cord is opposite to the threading direction of the metal sleeve. For example if the cord is right handed ('Z' lay), the threading must be left handed ('S' helix).

Furthermore, as the cabling angle of the strands is generally below 25°, typically around 15° but it can also be lower than that, the threading angle must be the complement of that angle. Hence, the threading angle should be less than 86° or more preferred less than 75°, but more than 15° or more than 25°.

By preference the threading has grooves with plateaus in between wherein the plateaus are wider than the grooves. This is to prevent that the sleeve would become structurally too weak due to lack of material.

The inventive advantage of the metallic sleeves as made by metal injection moulding is that the outer surface of the sleeve has a specified surface roughness that is preferably isotropic. The presence of an isotropic surface roughness is helpful for the manufacturing of the bead later. In classically bonded sawing beads—i.e. where an annular abrasive ring is soldered to the sleeve—surface roughness helps to increase the bonding strength between the abrasive ring and the sleeve. When the abrasive layer is applied through laser cladding, the specular reflection of the laser light is reduced and the surface absorbs the light better leading to faster heating of the surface and the faster formation of a melt pool. Also a bonding layer between the laser cladded material and the metal sleeve forms faster.

Firstly the outer surface of the metal sleeve must have a measurable degree of roughness. If the roughness is too low, there will be no advantages in the use of the sleeve in terms of bonding force or ability to clad with a laser. Secondly, the roughness must be isotropic. A surface is said to have an isotropic surface roughness when it presents identical roughness characteristics regardless of the direction of measurement.

The requirement that the surface of the sleeve shows a roughness that is isotropic can already be assessed with a simple optical microscope. A shiny surface will not offer a good solder bond or reflect the laser light too much in order to be usable for the purpose. Conventional metal sleeves show circular grooves on the outer surface due to the tooling on a lathe as the surface is turned, ground or brushed. Hence they show an anisotropic surface roughness.

Although the requirement of having an 'isotropic surface roughness' can be easily verified under a microscope, there is also the possibility to quantify this as per ISO 25178-2: 2012(E) in a 3D surface roughness measurement.

The 'arithmetical mean height $S_a$' is the measure for roughness in the direction perpendicular to the reference surface (called Z-direction) and is defined as (4.1.7 of the ISO 25178-2 standard):

$$S_a = \frac{1}{A} \int \int_A |z(x, y)| dx dy$$

over the definition area A. $z(x,y)$ is the measured ordinate value at position $(x,y)$ relative the reference surface that is in this case is a cylinder surface that is least square fitted to the measured points. Other measures of roughness are possible—such as 'root mean square height'—but are not considered here.

The inventors find that the 'arithmetical mean height $S_a$' must at least be 0.8 μm.

A measure to quantify the degree of anisotropy in the surface roughness is the 'texture aspect ratio $S_{tr}$'. It is determined by means of the 'autocorrelation function $f_{ACF}$' (3.2.8 of ISO 25178) that over the definition area 'A' can be defined as:

$$f_{ACF}(\tau_x, \tau_y) = \frac{\int \int_A z(x, y) z(x - \tau_x, y - \tau_y) dx dy}{\int \int_A z^2(x, y) dx dy}$$

The function is peaked at (0,0) where it is '1'. When making a cross section at $f_{ACF}(\tau_x,\tau_y)=s$, s being conventionally set to 0.2, the central zone around the origin will show a direction of fastest decay where the distance $\sqrt{\tau_x^2+\tau_y^2}$ is minimal and equal to $R_{min}$ and a direction of slowest decay where the distance is maximal and equal to $R_{max}$. The 'texture aspect ratio $S_{tr}$' is then defined as (4.2.2 of ISO25178) $R_{min}/R_{max}$. An isotropic surface will have an $S_{tr}$ close to one. By preference the $S_{tr}$ is larger than 0.8 or 80% for the metal sleeve according the invention.

According a second aspect of the invention a method to produce a metal sleeve for use as a carrier of an abrasive layer of a sawing bead is claimed as defined by the steps in the main method claim. Further specific and inventive features are added to the method in the dependent method claims.

The metal sleeve has the geometry as described and at least has an axial bore with an axial middle part and chamfered openings at either end. Basically the method is metal injection moulding that comprises the known steps of injection moulding a mixture of metal powder and binder into the cavity of a mould thereby forming a 'green sleeve'.

The mould cavity is specifically designed to produce metal sleeves for use as a carrier of an abrasive layer of a sawing bead. The mould cavity is formed by an outer shell having an interior surface delimited by a surface of revolution. This can e.g. be the cylindrical surface obtained by rotating a line parallel to the axis of the sleeve around the sleeve. Alternatively, if that line is oblique to the axis but does not cross it, the surface formed will be a hyperboloid of one sheet. The circular dale in the middle can serve to receive the abrasive layer during laser cladding.

As the rims of the sleeve can become thin due to the chamfered openings at either end, the rims maybe provided with extra outer material to resist the impact during use. While such rims make it impossible to slide an annular abrasive ring (as in the existing powder metallurgy route) over the sleeve this is not a problem for a laser cladded bead. Advantageously such protruding rim end may help as an indicator for the wear of the bead.

Alternatively, circumferential protrusions can be provided at either end of the cavity that will form recesses at the end of the finished metal sleeve. These recesses can receive polymer material and provide extra anchorage. Advantageously these recesses are obtained at no extra cost.

In a particular preferred embodiment, the interior surface of the outer shell can be textured to imprint a roughness on the outer surface of the metal sleeve. This is an alternative way to obtain sufficient roughness.

In the latter three embodiments, the outer shell must be made of two halves that can be separated over a plane comprising the axis of the mould cavity in order to remove the green sleeve from the mould.

A first and second pin can be entered and extracted from either side of the outer shell. When entered the first and second pin match one another midways the mould cavity and at the same time close the mould cavity. The first and second pin define the interior surface of the metal sleeve. The first and second pin are tapered toward their matching point. They can be axially extracted with or without a small rotative movement. In an optional additional step, the thus formed green sleeve is internally threaded prior to turning it into a brown sleeve. As the green sleeve is still very soft this can be easily done.

In an alternative preferred embodiment the first and second pin show a protruding screw. The screw direction is equal for both first and second pin. Preferably the helix formed by the top of the screw has a constant radius. The pitch of the screw is such that the angle of the screw helix to its axis is less than 86°. During opening of the mould the pins are rotary retracted from the green sleeve such that the axial bore is not damaged. When rotary retraction is performed while the sleeve is still hot after injection, the soft binder helps to unscrew the pins as it acts as a lubricant.

By preference the mould has from 4 to 12 individual cavities. This should suffice to make series of more than one million pieces economically. Gates to inject the hot feedstock in the mould cavity can be provided at the outer surface of the outer shell. Alternatively gates can be situated at the basis of the first or second pins. This may be somewhat better as it avoids blemish at the outer surface of the sleeve. Venting can be performed by means of venting recesses at the closing rim between first or second pin and outer shell.

Advantageously no extra machining is needed to make the internal threading of the sleeve compared to the prior art sleeves. It suffices if one of the pins is removed by rotary retraction. The release cycle can e.g. be like this:

A. The first pin is removed by rotary retraction out of the green sleeve;
B. The two halves of the outer mould open;
C. The second pin is screwed out of the sleeve.

Alternatively the order A, then C then B can also be followed. The green sleeve is freed of its binder according to one of the known methods described above resulting in a 'brown sleeve'. Finally the latter is sintered into the final product.

The resulting sleeve is very well suited for making a sawing bead by means of laser cladding. In this production method an abrasive layer is deposited onto the metal sleeve by melting a metal matrix powder (fed by means of a gas flow or by means of wire feed) onto the metal sleeve by means of a high energy laser. Concurrently, abrasive materials are fed into the molten metal pool. Such a production method is extensively described in WO 2012/119946, paragraphs [26] to [48] of the published PCT application herewith incorporated by reference. Although different metallographic structures in the abrasive layer can be obtained by laser cladding—such as cellular, layered or dendritic—the inventors find the dendritic structure most appropriate. The metal sleeve according the invention is particularly suited for laser cladding because the isotropic roughness of the sleeve prevents specular reflection of the laser beam thereby improving the energy coupling of the laser light into the sleeve material. Prior art sleeves are either too shiny and/or have anisotropic roughness in circular direction that does not eliminate specular reflection enough.

The inventors find that in order to allow sufficient ingress of polymer into the sawing bead when sealing the sawing cord with polymer there must be sufficient clearance between the cord and the axial bore of the sleeve. The minimal inner diameter of the metal sleeve must be between 2 and 8%, more preferably between 3 and 6% larger than the diameter of the steel cord. It has been observed that a clearance below 2% results in inferior fatigue behaviour for the steel cord. At the other hand when the clearance is higher than 8% the overall diameter of the sleeve becomes too large leading to an increased sawing bead diameter.

The presence of an internal threading additionally helps the ingress of polymer during the polymer injection. Preferably the injection mould as described in WO 2013/102542 A1 by the current applicant is used to this end. The mould ensures centric moulding of the steel cord and good penetration of the polymer under the sleeves.

Additionally when the internal threading is about perpendicular to the strands of the steel cord, the force transfer from the strand to the metal sleeve will be optimal during sawing. Hence, it is therefore preferred that the internal screw direction of the sleeve is opposite to the lay direction of the steel cord.

In a fifth aspect of the invention, the use of the metal injection moulding process to make a sleeve for use as a carrier of an abrasive layer for a sawing bead according the above description is claimed.

DETAILED DESCRIPTION OF THE INVENTION

Figure 1:
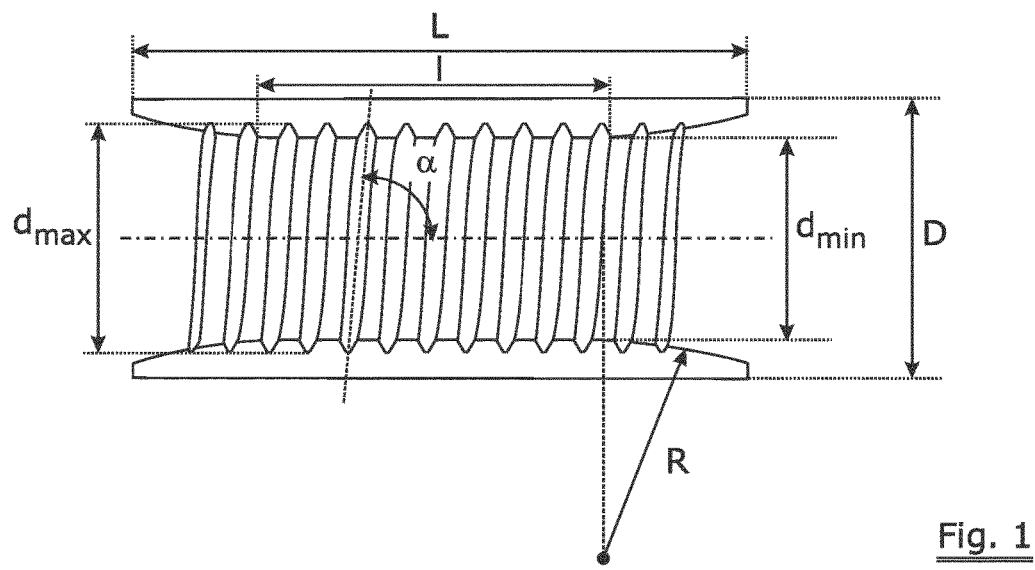
FIG. 1 describes the geometry of the metal sleeve.

FIG. 1 shows a cross section of the inventive sleeve. The sleeve has an overall length 'L' and an outer diameter 'D'. It has an axial bore with axial middle part with minimal diameter '$d_{min}$' and length 'I'. The openings at either end are chamfered and show a radius of curvature of 'R'. The middle part is a cylinder co-axial with the axis of the sleeve. In this case the chamfering is trumpet shaped with a constant radius of curvature. When a threading is present it has a certain pitch angle denoted by 'α'.

Five test sleeves (identified with S3.6/'I') were made of the following dimensions:
- 'L'=11 mm
- 'D'=4.98 mm
- '$d_{min}$'=3.6 mm
- 'I'=0 (S3.6/0), 3 (S3.6/3), 5 (S3.6/5), 7 (S3.6/7) and 11 mm S3.6/11) (i.e. I=0×L, 0.272×L, 0.454×L, 0.636×L and 1×L)
- 'R' is for the respective designs 36.22 mm (S3.6/0), 19.26 mm (S3.6/3), 10.92 mm (S3.6/5), 4.97 mm (S3.6/7) and 0 mm (S3.6/11)

No threading was provided to test the influence of the shape parameters. In any case the thickness of the sleeve rim at both ends was kept constant to 0.27 mm in order not to have strength issues at the end.

So a sleeve with 'I=0' will not show a cylindrical inner part but only a constant curvature of radius 36.22 mm. At the other extreme 'I=1×L' the cylindrical part extends from one end to the other and no chamfering is present. In the intermediate design with 'I=3 mm' the chamfering shows a constant radius of curvature of 19.26 mm.

Figure 6:
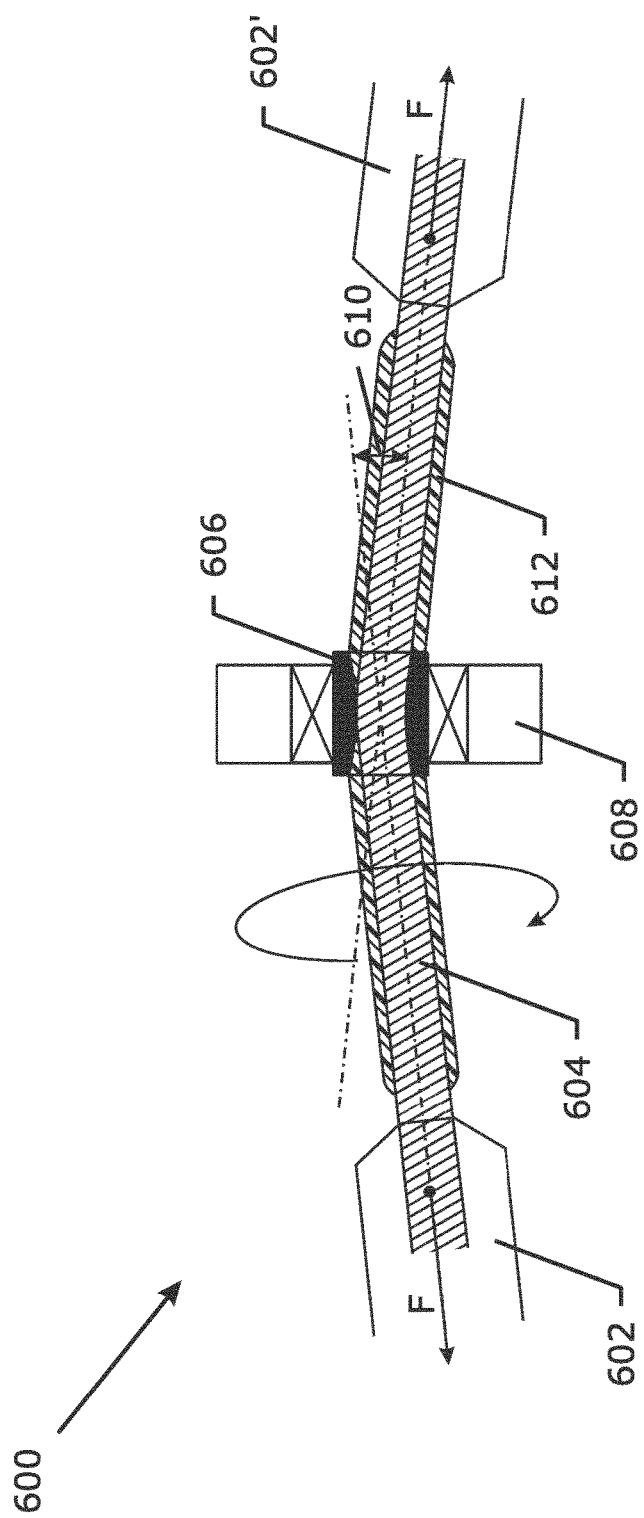
FIG. 6 shows schematically the arrangement of the fatigue test rig.

The sleeves were subjected to a fatigue test rig 600 as schematically described in FIG. 6. A steel cord 604 of type 7×7 with a diameter of 3.5 mm is held taut between rotary drill chucks 602, 602'. The tension force 'F' on the cord is held constant at 2000 N (which is about the normal working tension of a sawing cord). The axes of the drill chucks 602, 602' are mounted under a small angle 610 of 12°. In the middle of the drill chucks a sleeve under test 606 is mounted in a rotary sleeve holder 608. The cord exits at either end of the sleeve holder at 6° relative to the rotary axis of the sleeve holder 608. The cord with sleeve is embedded into polyurethane prior to the testing. The cord is made to rotate at 400 rpm. The number of revolutions till break of the cord is registered for at least five repetitions. Thereafter another sleeve under test is mounted.

The following results were obtained (Table I):

TABLE I

| Sleeve | Average cycles | Standard deviation |
| --- | --- | --- |
| S3.6/0 | 128023 | 54856 |
| S3.6/3 | 208302 | 95748 |
| S3.6/5 | 233462 | 74899 |
| S3.6/7 | 155649 | 39952 |
| S3.6/11 | 140573 | 3360 |

Best results are obtained with a sleeve having a cylindrical axial middle part length 'I' between 0.25×L to 0.75×L and a radius of curvature between 10 and 20 mm. In what follows the sleeve design S3.6/5 was selected.

Figure 3A:
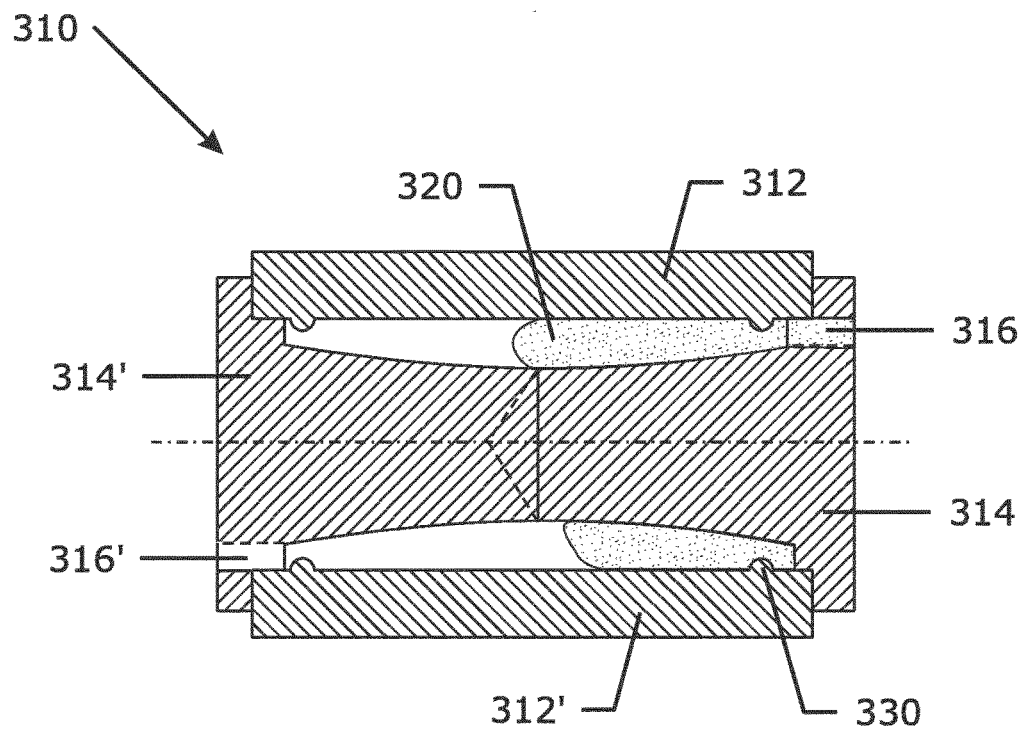
FIGS. 3a and 3b is a first preferred method to make the metal sleeve according the invention.
Figure 3B:
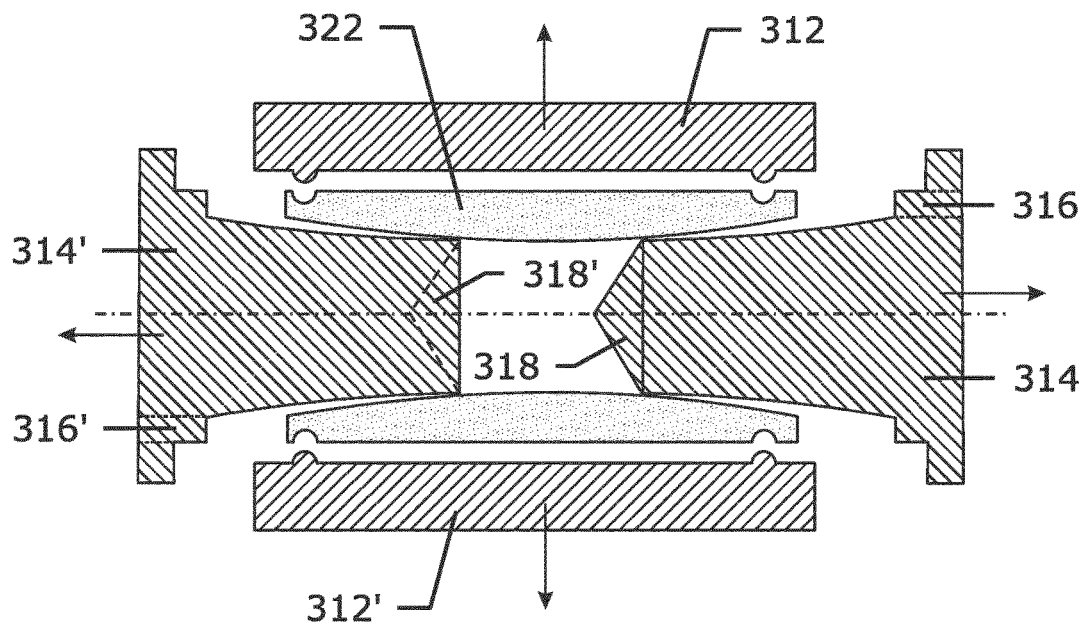

Sleeves with the above geometry can be made by metal injection moulding as described in FIGS. 3a and 3b. There a cylindrical mould 310 is made from two half moulds 312, 312' that are joinable at a plane comprising the axis of the sleeve. When joined the two half moulds 312, 312' form an outer shell wherein the inner surface shows a surface of revolution with the axis of the sleeve as the axis of revolution. First and second metal pins 314 and 314' are insertable from either end of the outer shell. The pins have mating ends at 318, 318' that are jointed when inserted into the outer shell. The inner surface of the outer shell is provided with an annular rim 330 for filling with polyurethane when the sawing cord is made to provide for a better seal between polyurethane and sleeve.

Feedstock 320 is injected at high pressure by a standard plunger injection screw through spout hole 316 while vent hole 316' allows for the escape of air and superfluous feedstock. The internal cavity of the mould is filled within milliseconds. Thereafter the mould is opened and a green sleeve is obtained. As in this embodiment the first and second pins 314, 314' are tapered towards the middle and are smooth the pins can be retracted axially from the mould. After opening of the two half moulds 312, 312', a 'green sleeve' 322 is obtained. This green sleeve can easily be threaded internally as it is still very soft and easily deformable.

Figure 4A:
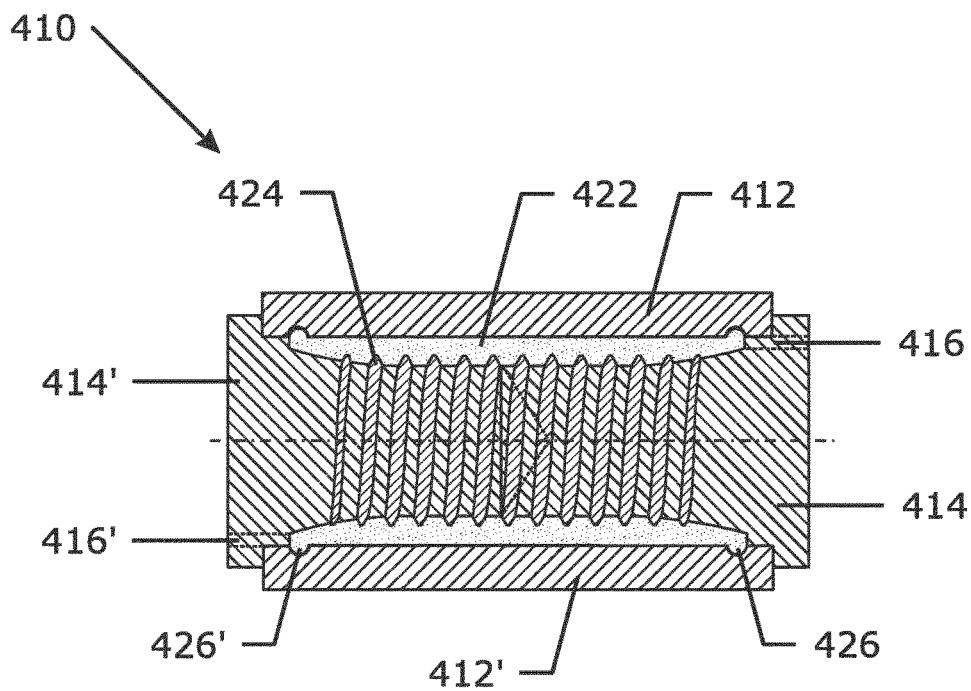
FIGS. 4a and 4b is a second preferred method to make the metal sleeve according the invention.
Figure 4B:
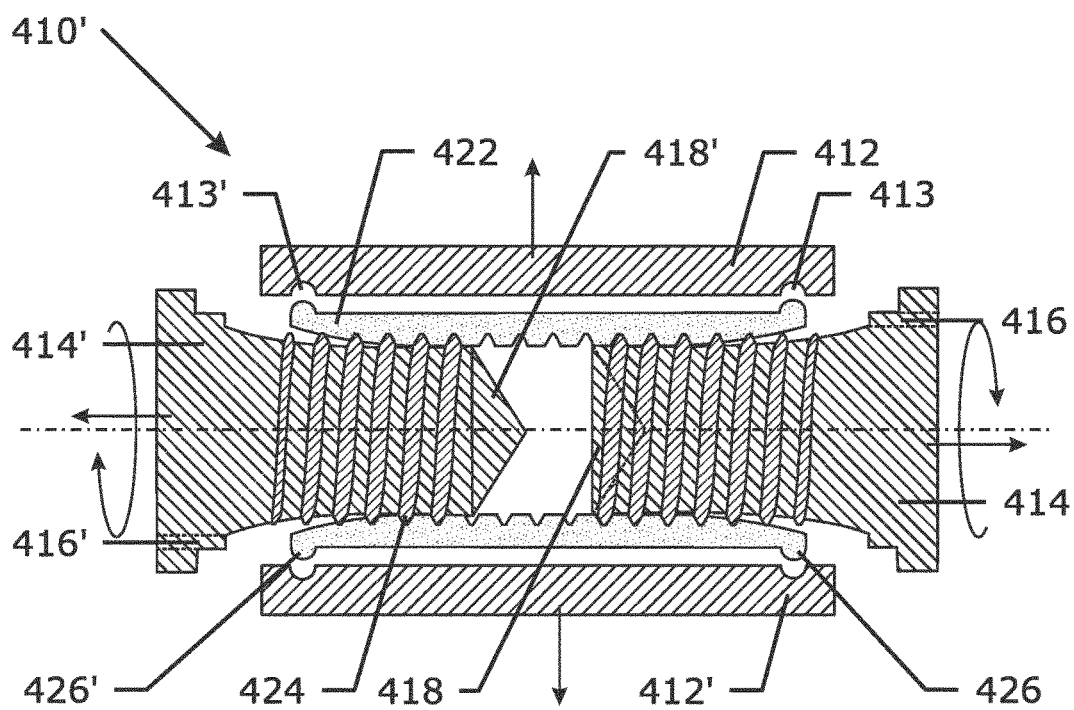

An alternative design of the mould 410 is shown in FIG. 4a. Again a mould cavity is formed by an outer shell made of two half moulds 412, 412'. The first and second pin 414, 414' both show a protruding screw 424 in this case in 'S' direction. Again spout 416 and vent holes 416' are provided. The injection in axial direction of the feedstock is preferred as this gives no blemish to the outer surface of the sleeve. Green sleeve 422 is now released by screwing first and second pins 414, 414' out of the outer shell, prior to opening the two half moulds 412, 412'. Important here is that the unscrewing is done while the green sleeve is still hot in order to prevent gripping of the pins in the green sleeve and to prevent degradation of the threading.

An additional inventive feature is that half-moulds 412, 412' are also provided with a circular recess 413, 413' at either end of the mould cavity. After injection this results in extra material 426, 426' being present at the rim at either end of the sleeve. This extra material 426, 426' reinforces the sleeve and makes it better resistant to impact at entry into the work piece. The recesses 413, 413' here have a semi-circular cross section but they can of course have any cross section such as rectangular or triangular.

Although this method is a little more complicated, it allows for an internal threading of the sleeve. Unlike an ISO standardised metric screw thread (see ISO 68-1) this threading shows plateaus in between the screw. This is to keep the sleeve strong enough, while still having sufficient ingress of material. In this case an internal threading that makes an angle of 85° with the axis of the sleeve was chosen. The following feedstock materials were tested:

Feedstock available from PolyMIM®
  MIM 2200 FN02 Nominal alloy composition:
    Ni (1.5 to 2.5 wt %), Mo (0.5 wt % max), Si (1.0 wt % max), C (0.1 wt % max), Fe (the balance).
  MIM 2200 FN08 Nominal alloy composition:
    Ni (6.5 to 8.5 wt %), Mo (0.5 wt % max), Si (1.0 wt % max), C (0.4-0.6 wt %), Fe (the balance).
  MIM 17-4 PH Nominal alloy composition:

Cr (15-17.5 wt %), Ni (3.0-5.0 wt %), Mn (1.0% max), Si (1.0 wt % max), Cu (3.0 to 5.0 wt %), C (0.07% max), Fe (the balance).

The PolyMIM system allows for water based debinding of the green sleeve (demin water at 40-60° C. for about 5 hours, plus 2 hours drying). In the PolyMIM system the mold is kept at 40 to 60° C., the temperature of the feedstock at the nozzle at 190° C. while an injection pressure of between 750 to 950 is needed. Feed rate is between 3 to 25 cm$^3$/s Feedstock according Catamold® system of BASF (see e.g. U.S. Pat. No. 5,802,437):

Stainless steel 316L Nominal alloy composition:
Cr (16-18 wt %), Ni (10-14 wt %), Mo (2-3 wt %), Mn (2.0% max), Si (1.0% max), C (0.03% min), Fe (the balance).

The Catamold® system is based on catalytic debinding at 110° C. in a HNO$_3$ environment (afterburn required).

Sintering cycles are prescribed by the feedstock supplier. Typically they include a hold step for about 1 to 2 hours at 600° C. and a 2 to 3 hour hold step at final temperature (1290° C. to 1380° C. depending on the alloy). The sintered sleeves showed a good density of over 95% of the theoretically possible density. In an metallographic cross section micron sized (1 to 5 μm) pores remain visible. This is proof that sleeves have been made by metal injection moulding.

Figure 2:
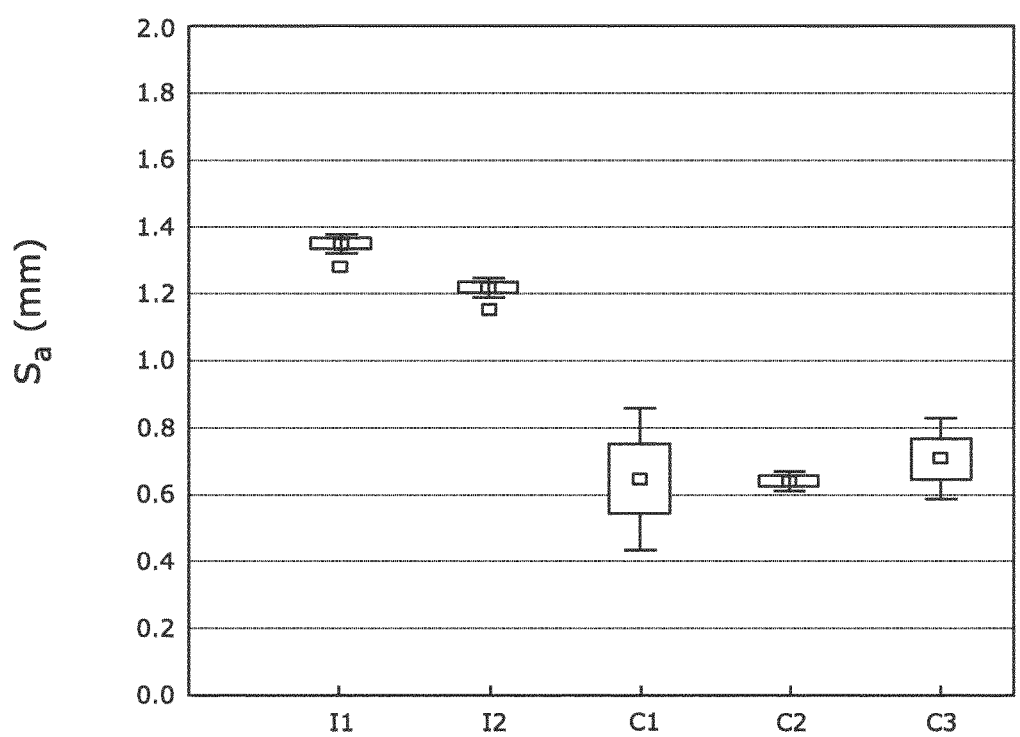
FIG. 2 are measurements of surface roughness of different types of sleeves.

A 3D roughness measurement with an OLS4000 3D Measuring Laser Microscope of Olympus® was performed on conventional sleeves and sleeves made by metal injection. The % parameter 'surface arithmetical mean height' was measured. The results are summarised in FIG. 2. Samples C1, C2, and C3 are made in the conventional way. Samples I1 and I2 were made by metal injection moulding. Sample I1 was a Stainless 316L sample made by the Catamold® route, while sample I2 was made of MIM 17-4PH obtained via the PolyMIM route. There is a marked difference in roughness between both samples: the MIM type samples clearly show a higher roughness than the conventional samples.

Figure 5A:
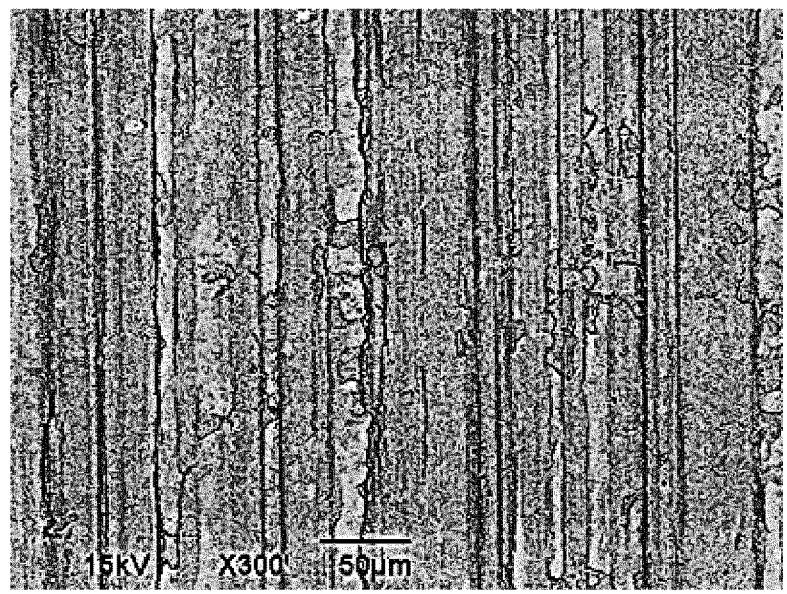
FIGS. 5a and 5b shows the surface of a conventional metal sleeve and an inventive metal sleeve.
Figure 5B:
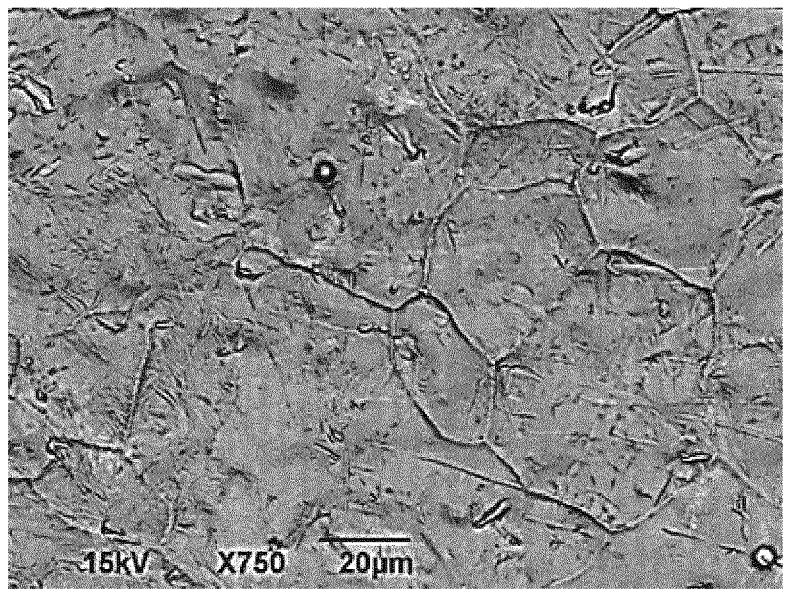

Scanning electron microscope pictures (FIGS. 5a and 5b) clearly show a different topography between the conventional method (FIG. 5a) and the inventive method (FIG. 5b) for making the sleeves. The conventional sleeves show the traces of the machining in the direction perpendicular to the axis of the sleeve resulting in a clear anisotropy. The inventive sample (FIG. 5b) shows an isotropic, paved-like surface structure. Note that pictures have been contrast enhanced to bring forward the differences.

Preliminary laser cladding test showed that the inventive sleeves need 10 to 20% less laser power to start cladding compared to conventional, machined sleeves. The inventors attribute this reduction to the increased surface roughness leading to a less specular reflection of the laser beam and thus better coupling-in of the laser energy.

The sleeves of type S36/5 made of FN02 were successfully used to produce sawing beads by means of laser cladding. The sleeves were used on cord of type 7×7 of diameter 3.5. The outer strands in this cord were laid in direction 'Z' opposite to the 'S' threading inside the sleeve.

The invention claimed is:

1. A method to produce a metal sleeve for use as a carrier of an abrasive layer of a sawing bead, said metal sleeve having an axial bore with an axial middle part and chamfered openings at either end, said method comprising; metal injection moulding a mixture of metal powder and binder in a mould having a mould cavity thereby forming a green sleeve that is subsequently freed of its binder and sintered to final shape, wherein said mould cavity is formed by an outer shell having an interior surface delimited by a surface of revolution about an axis of said mould cavity and a first and second pin enterable and retractable from opposite ends of said outer shell thereby closing or opening said mould cavity, said first and second pin contacting one another midway in said mould cavity, said pins are tapered towards their contact point.

2. The method according to claim 1, wherein said interior surface of said outer shell is textured.

3. The method according to claim 1, wherein said surface of revolution is a cylinder.

4. The method according to claim 1, wherein said surface of revolution is a hyperboloid of one sheet.

5. The method of claim 1, wherein said metal powder has a median particle size, said median particle size is between 2 μm and 50 μm.

6. The method according to claim 1, wherein said first and second pin have a protruding external screw thread, said first and second pins are rotary retracted from said green sleeve.

7. The method according to claim 6, wherein said interior surface of said outer shell is textured.

8. The method according to claim 6, wherein said protruding external screw thread has a pitch with an angle between the thread helix and said axis of said mould cavity less than 86°.

9. The method of claim 6, wherein said outer shell is made of two half-moulds separable over a plane through said axis of said mould cavity and wherein said green sleeve is released in the following order:
   a. said first pin is removed by rotary retraction out of said green sleeve;
   b. said half-moulds forming said mould cavity are separated;
   c. said second pin is screwed out of said green sleeve.

10. The method of claim 6, wherein said outer shell is made of two half-moulds separable over a plane through said axis of said mould cavity and wherein said green sleeve is released in the following order:
   a. said first pin is removed by rotary retraction out of said green sleeve;
   b. said second pin is screwed out of said green sleeve;
   c. said half-moulds forming said mould cavity are separated.

11. The method according to claim 1, wherein said outer shell is made of two half-moulds separable over a plane through said axis of said mould cavity.

12. The method according to claim 11, wherein said half-moulds are provided with circular recesses at either end of said mould cavity.

13. The method according to claim 11, wherein said half-moulds are provided with circumferential protrusions at either end of said mould cavity.

14. The method according to claim 11, wherein said interior surface of said half-moulds forming said outer shell is textured.

* * * * *